(12) United States Patent
Hsiao et al.

(10) Patent No.: US 12,629,903 B2
(45) Date of Patent: May 19, 2026

(54) METHOD OF MAKING GOLF CLUB HEAD

(71) Applicant: ADVANCED INTERNATIONAL MULTITECH CO., LTD., Kaohsiung City (TW)

(72) Inventors: Te-Fu Hsiao, Kaohsiung City (TW); Pei-Yao Lin, Kaohsiung City (TW); Yuan-Jen Hou, Kaohsiung City (TW); Yen-Zhou Xie, Kaohsiung City (TW); You-Chi Chen, Kaohsiung City (TW)

(73) Assignee: ADVANCED INTERNATIONAL MULTITECH CO., LTD., Kaohsiung City (TW)

( * ) Notice: Subject to any disclaimer, the term of this patent is extended or adjusted under 35 U.S.C. 154(b) by 20 days.

(21) Appl. No.: 18/178,271

(22) Filed: Mar. 3, 2023

(65) Prior Publication Data

US 2024/0208161 A1      Jun. 27, 2024

(30) Foreign Application Priority Data

Dec. 23, 2022    (TW) .................................. 111149773

(51) Int. Cl.

| | |
|---|---|
| *A63B 53/04* | (2015.01) |
| *B29C 70/22* | (2006.01) |
| *B29C 70/48* | (2006.01) |
| *B29K 301/12* | (2006.01) |
| *B29L 31/52* | (2006.01) |

(52) U.S. Cl.
CPC .............. *B29C 70/48* (2013.01); *B29C 70/22* (2013.01); *A63B 53/04* (2013.01); *A63B*

*2209/023* (2013.01); *B29K 2301/12* (2013.01); *B29L 2031/5227* (2013.01)

(58) Field of Classification Search
CPC ...................................................... A63B 53/04
See application file for complete search history.

(56) References Cited

U.S. PATENT DOCUMENTS

| | | | | |
|---|---|---|---|---|
| 4,545,580 A | * | 10/1985 | Tomita ............... | A63B 53/0466 |
| | | | | 473/347 |
| 4,581,190 A | * | 4/1986 | Nagamoto ............. | A63B 60/00 |
| | | | | 264/137 |
| 4,754,975 A | * | 7/1988 | Aizawa ................... | A63B 53/04 |
| | | | | 73/12.14 |
| 5,078,397 A | * | 1/1992 | Aizawa ................... | B29C 70/84 |
| | | | | 273/DIG. 7 |
| 6,723,279 B1 | * | 4/2004 | Withers ................ | C22C 1/1036 |
| | | | | 419/14 |
| 8,651,975 B2 | * | 2/2014 | Soracco ................. | A63B 53/04 |
| | | | | 473/332 |

(Continued)

*Primary Examiner* — Andrew D Graham
(74) *Attorney, Agent, or Firm* — Muncy, Geissler, Olds & Lowe, P.C.

(57) ABSTRACT

A method of making a golf club head includes a preparation step, a weaving step, and a forming step. In the preparation step, a pattern of a golf club head having a plurality of parts is drawn using a computer. In the weaving step, a plurality of fiber bundles are woven to form a rough blank simulating the pattern of the golf club head drawn by the computer. The rough blank has a plurality of portions corresponding to the parts of the golf club head. In the forming step, the rough blank is placed in a mold, after which applying one of heat and energy to the mold is performed to form the golf club head having an uneven thickness.

3 Claims, 5 Drawing Sheets

(56)        References Cited

U.S. PATENT DOCUMENTS

| 8,864,604 | B2 * | 10/2014 | Matsunaga | ............ | A63B 60/00 |
| | | | | | 473/346 |
| 9,504,895 | B2 * | 11/2016 | Davenport | ......... | A63B 69/3614 |
| 10,442,144 | B2 * | 10/2019 | Stites | .................... | A63B 53/04 |
| 2022/0379175 | A1 * | 12/2022 | Martens | ............. | B29C 66/7212 |

* cited by examiner

METHOD OF MAKING GOLF CLUB HEAD

CROSS-REFERENCE TO RELATED APPLICATION

This application claims priority to Taiwanese Invention Patent Application No. 111149773, filed on Dec. 23, 2022.

FIELD

The present disclosure relates to a manufacturing method, and more particularly to a method of making a golf club head having an uneven thickness.

BACKGROUND

A conventional golf club head is made of an all-metal material to ensure that it has the strength to withstand long-term impact. However, the metal golf club head is not only expensive, but also is heavy. With the advent of composite materials, such as carbon fiber plates, which are lightweight but high-strength materials, they are often made into parts of a golf club head, such as a striking panel, a top cover, etc. These parts are used to replace a portion of the metal structure of the golf club head in order to maintain sufficient structural strength while reducing the weight thereof.

Generally, in the manufacturing process of a carbon fiber composite part, a plurality of prepegs are first stacked layer by layer, after which an initial cutting is performed to obtain a laminate. Then, a plurality of reinforcement strips are stacked on the laminate. The reinforcement strips are often stacked on top of each other at different angles for added strength, and the excess parts thereof are cut off. A hot press molding is then performed on the laminate to obtain a rough blank. Finally, a machine, such as a CNC machine, can be used to process an outer shape of the rough blank and thereby obtain a golf club head part.

However, the above manufacturing process is not only cumbersome, but also consumes a lot of time and labor costs in laminating and cutting operations. The rough blank after hot press molding must still undergo additional shape processing to obtain the golf club head part, so that the production efficiency of the above manufacturing process is poor. In addition, due to the poor fluidity of the resin on the prepegs, the rough blank after hot press molding often has more defects, and at the same time, it is also difficult to form a more complex shape in terms of appearance. Hence, there is still room for improvement of the above manufacturing process.

SUMMARY

Therefore, an object of the present disclosure is to provide a method of making a golf club head that can alleviate at least one of the drawbacks of the prior art.

According to this disclosure, the method of making a golf club head includes a preparation step, a weaving step and a forming step. In the preparation step, a pattern of a golf club head having a plurality of parts is drawn using a computer. In the weaving step, a plurality of fiber bundles are woven to form a rough blank simulating the pattern of the golf club head drawn by the computer. The rough blank has a plurality of portions corresponding to the parts of the golf club head. At least a portion of the rough blank is formed by weaving multi-axially two or more fiber bundles, while the other portions thereof are formed by weaving single or more fiber bundles. Each fiber bundle is composed of a plurality of fibers selected from the group consisting of inorganic fibers, thermoplastic fibers and metal fibers. In the forming step, the rough blank is placed in a mold, after which applying one of heat and energy to the mold is performed to form the golf club head having an uneven thickness.

BRIEF DESCRIPTION OF THE DRAWINGS

Other features and advantages of the present disclosure will become apparent in the following detailed description of the embodiments with reference to the accompanying drawings. It is noted that various features may not be drawn to scale.

DETAILED DESCRIPTION

Figure 1:
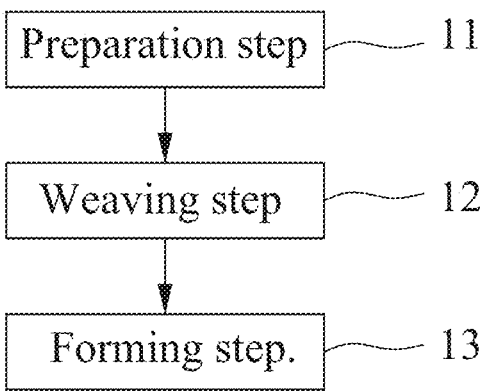
FIG. 1 is a flow chart illustrating the steps involved in a method of making a golf club head according to the first embodiment of the present disclosure.

Referring to FIG. 1, in combination with FIGS. 2 to 5, a method of making a golf club head 2 according to the first embodiment of the present disclosure includes a preparation step 11, a weaving step 12, and a forming step 13.

Figure 2:
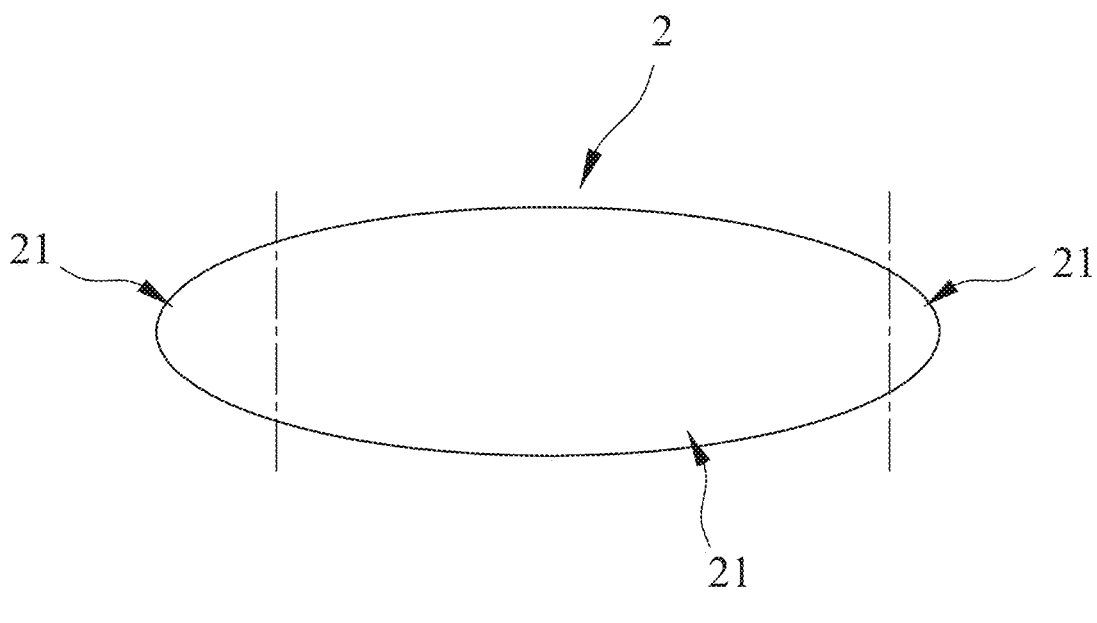
FIG. 2 is a schematic view illustrating a preparation step of the first embodiment, in which a pattern of a desired appearance of the golf club head to be made is drawn.

In the preparation step 11, with reference to FIG. 2, a pattern of a desired appearance of the golf club head 2 to be made is drawn using a computer. The golf club head 2 has a plurality of parts 21 with different thicknesses. It should be noted that the thickness of each part 21 refers to the thickness measured in a lateral direction of the golf club head 2. However, in actual practice, the thickness may be measured in other directions according to the requirement. In this embodiment, as shown in FIG. 2, the golf club head 2 is divided into three parts 21: a central part 21 and two side parts 21 located on two opposite sides of the central part 21, but this is only an example. In fact, more complex and more regional divisions may be designed according to product appearance requirements.

Figure 3:
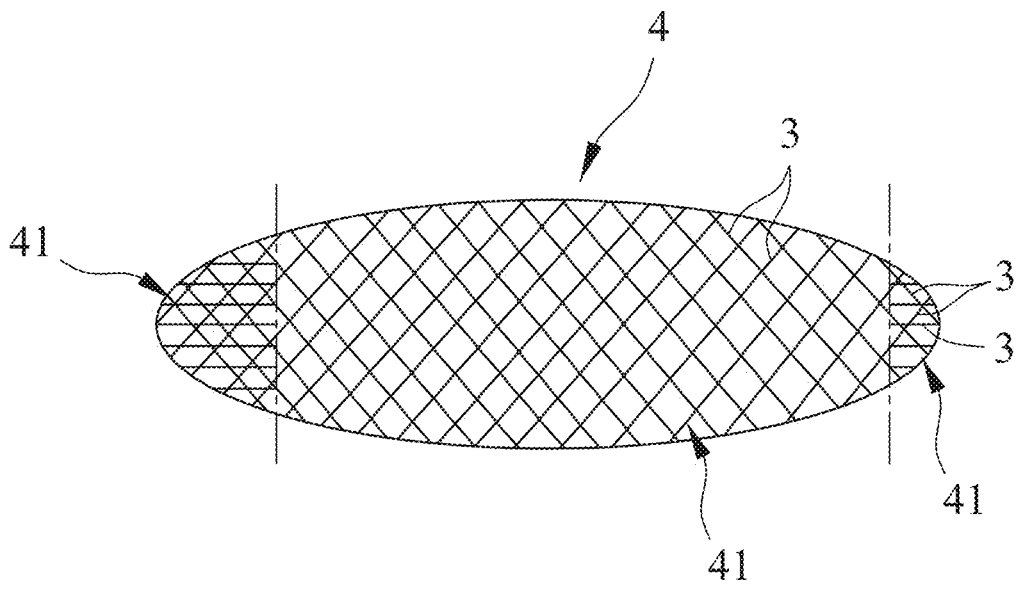
FIG. 3 is a schematic view illustrating a weaving step of the first embodiment.

In the weaving step 12, with reference to FIG. 3, a plurality of fiber bundles 3 are woven to form a rough blank 4 simulating the pattern of the golf club head 2 drawn by the computer. The rough blank 4 has three portions 41 corresponding to the three parts 21 of the golf club head 2. At least a portion of the rough blank 4, for example, the portion 41 corresponding to the central part 21 of the golf club head 2, can be formed by weaving multi-axially two or more fiber bundles 3; while the other portions thereof, for example, the portions 41 corresponding to the side parts 21 of the golf club head 2, can be formed by respectively weaving uniaxially single fiber bundles 3 and weaving biaxially two fiber bundles 3 or weaving triaxially three fiber bundles 3. Uniaxial weaving of single fiber bundles 3 is performed to obtain a thinnest part 21 of the golf club head 2. Biaxial weaving is performed on two fiber bundles 3 to obtain a thin part 21 of the golf club head 2, but thicker than that of the part 21 using the single fiber bundles 3. Triaxial weaving is performed on three fiber bundles 3 to obtain a thick part 21 of the golf club head 2 thicker than the parts 21 using the single and two fiber bundles 3. After continuous weaving of the fiber bundles 3, the rough blank 4 having an uneven thickness is obtained. Each fiber bundle 3 is formed by braiding a plurality of fibers. The fibers can be selected from the group consisting of inorganic fibers, such as glass fibers, carbon fibers, Kevlar fibers, ceramic fibers, etc.; thermoplastic fibers, such as polypropylene (PP) fibers, polyester (PET) fibers, nylon fibers, etc.; and metal fibers, such as titanium wires, copper wires or steel wires. The part 21 using the triaxial weaving can be woven with three fiber bundles 3 of different fibers to achieve the required structural strength and physical properties.

It should be noted that, according to different thickness change and thickness requirement, the parts 21 can be made by using uniaxial weaving of the single fiber bundles 3 or multi-axial weaving of two or more fiber bundles 3. Even if the parts 21 are woven with the same number of fiber bundles 3, the final thickness can be fine-tuned by adjusting the number of fibers (K number) contained in each fiber bundle 3 to produce more diverse and more complex appearance changes. Furthermore, when weaving each fiber bundle 3, the fiber direction can be adjusted during weaving according to the force direction of the corresponding part 21, that is, in addition to the common plus or minus 45 degrees and 0 degrees, it can also be other angles, such as 23.5 degrees.

Figure 4:
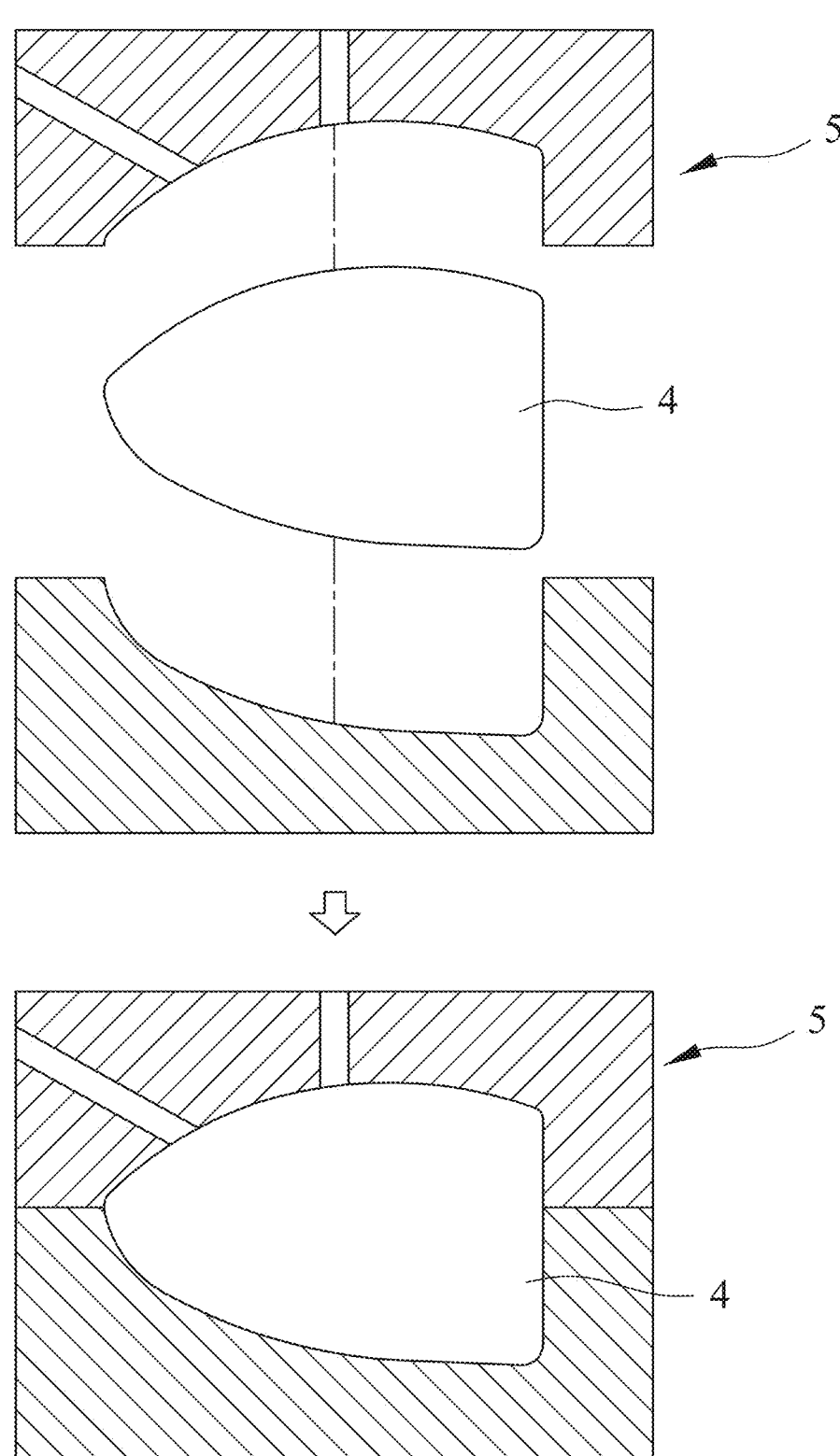
FIG. 4 is a schematic view illustrating a forming step of the first embodiment.
Figure 5:
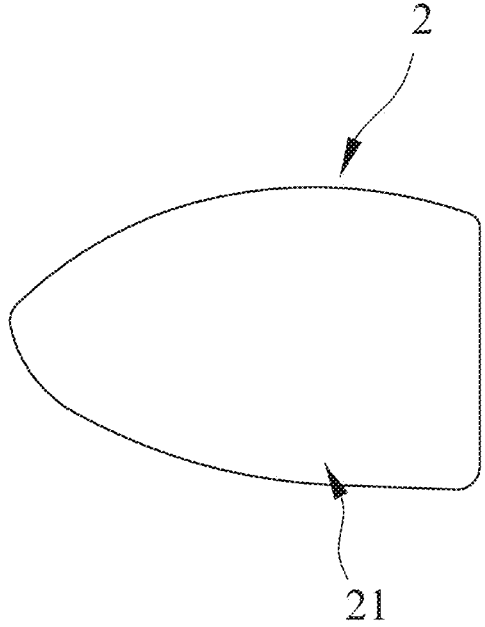
FIG. 5 is a schematic view of the golf club head obtained from the method of the first embodiment.

In the forming step 13, with reference to FIG. 4, the rough blank 4 is placed in a mold 5, after which air is withdrawn from the mold 5 to place the same in a vacuum state. The rough blank 4 shown in FIG. 4 is viewed from the right side of FIG. 3, which is a front side of the rough blank 4. After the mold 5 is in the vacuum state, resin in liquid state is poured into the mold 5, and the mold 5 is then heated and pressurized. The resin will penetrate the rough blank 4 and cover the same. Finally, when the resin is cured, the golf club head 2, as shown in FIG. 5, is obtained. The golf club head 2 has the parts 21 (see FIG. 2) with uneven thicknesses.

In the first embodiment, automatic continuous production can be carried out through the weaving method, so that the intervention of human factors can be reduced, and the production process can also be reduced, thereby greatly saving manpower and improving production efficiency. Moreover, the rough blank 4 formed from weaving uniaxially or multi-axially fiber bundles 3 has a stable product quality, and does not require post-processing, such as cutting or trimming. Additionally, by weaving different numbers of fiber bundles 3 at different positions, the golf club head 2 with multiple parts 21 having different thicknesses and a complex shape can be formed. Furthermore, according to requirements, different types of fiber bundles 3 can be mixed and woven, fiber bundles 3 with different K numbers can be mixed, and even the fiber direction of each fiber bundle 3 can be adjusted according to the direction of force. Hence, the method of this disclosure is very flexible and competitive in terms of changes.

Figure 6:
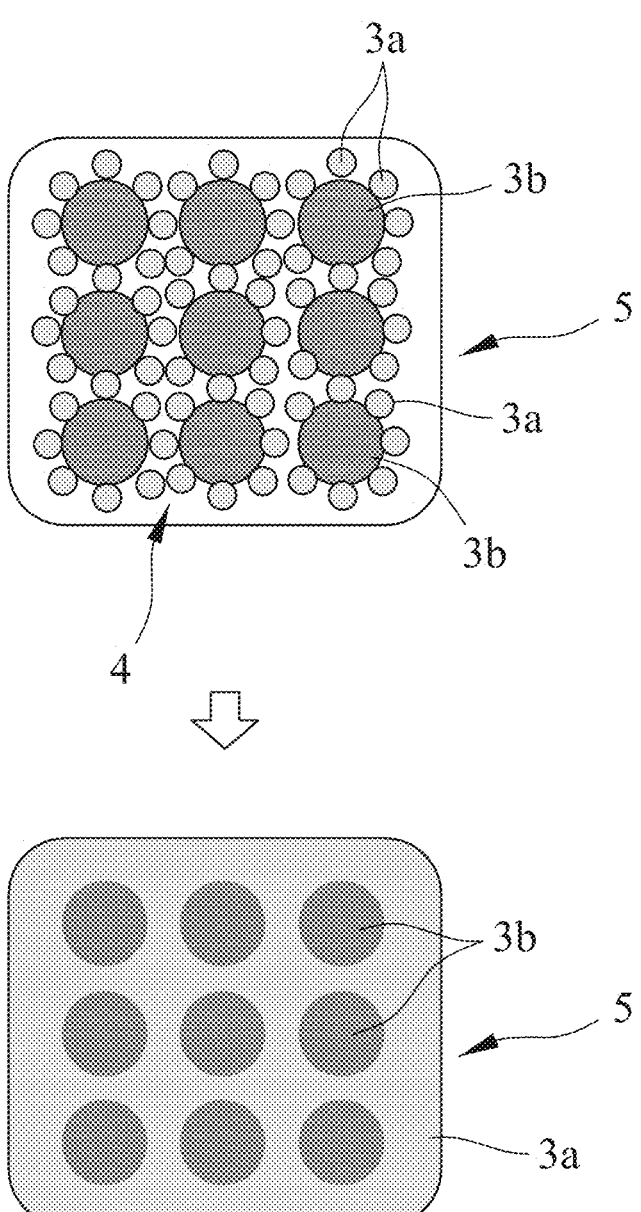
FIG. 6 is an enlarged schematic sectional view illustrating a method of making a golf club head according to the second embodiment of the present disclosure.

Referring to FIG. 1, in combination with FIGS. 5 and 6, a method of making the golf club head 2 according to the second embodiment of the present disclosure is shown to be identical to the first embodiment, and differs in that, in the weaving step 12 of the second embodiment, the fibers of some of the fiber bundles (3a) are made from thermoplastic fibers, while the fibers of the remaining ones of the fiber bundles (3b) are made from other types of fibers. Further, in the forming step 13 of the second embodiment, the mold 5 is heated, or energy, such as chemical energy, light energy (such as visible light) or radiation energy (such as infrared rays, ultraviolet rays, microwaves, etc., which are generated by photons) is applied thereto to melt the fiber bundles (3a) woven from the thermoplastic fibers, after which the mold 5 is pressurized to shape the rough blank 4. Finally, the golf club head 2 is formed when the fiber bundles (3a) and the fiber bundles (3b) are cured. It should be noted that the fiber bundles (3b) made from the other types of fibers are not melted during application of heat or energy to the mold 5, and is surrounded by the fiber bundles (3a) after curing. The second embodiment provides another forming method that does not require pouring of resin or vacuuming, thereby increasing the flexibility and choice in manufacturing.

In summary, this disclosure can carry out automatic continuous production through the weaving method, thereby reducing the intervention of human factors and reducing the production process. Further, the rough blank 4 formed from weaving uniaxially or multi-axially fiber bundles 3 has a stable product quality, and through weaving at different positions with different numbers of fiber bundles 3, the golf club head 2 with different thicknesses and a more complex shape can be formed, thereby improving the attractiveness and competitiveness of the product. In addition to pouring resin, forming can also be performed by melting and curing the fiber bundles (3a) made from thermoplastic fibers, providing flexibility in manufacturing. Therefore, the object of the present disclosure can indeed be achieved.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:
1. A method of making a golf club head comprising:
a preparation step, in which a pattern of a golf club head having a plurality of parts is drawn using a computer, the parts of the golf club head including a central part and two side parts located on two opposite sides of the central part;

a weaving step, in which a plurality of fiber bundles are woven to form a rough blank simulating the pattern of the golf club head drawn by the computer, the rough blank having a plurality of portions corresponding to the parts of the golf club head, at least a portion of the rough blank which corresponds to the central part of the golf club head being formed by weaving multi-axially two or more fiber bundles, remaining portions of the rough blank which correspond respectively to the two side parts of the golf club head being formed by weaving single or more fiber bundles, each of the fiber bundles being composed of a plurality of fibers, wherein a number of fiber bundles of the at least a portion of the rough blank which corresponds to the central part of the golf club head is different from a number of fiber bundles of each of the remaining portions of the rough blank which correspond respectively to the two side parts of the golf club head, and a thickness of the at least a portion of the rough blank which corresponds to the central part of the golf club head is different from a thickness of each of the remaining portions of the rough blank which correspond respectively to the two side parts of the golf club head; and a forming step, in which the rough blank is placed in a mold, after which applying one of heat and energy to the mold is performed to form the golf club head having an uneven thickness from the central part to each of the two side parts thereof;

wherein, in the weaving step, the fibers of at least one of the fiber bundles are thermoplastic fibers, while the fibers of the remaining ones of the fiber bundles are inorganic fibers or metal fibers;

wherein, in the weaving step, biaxial weaving is performed on two of the fiber bundles to obtain one of the remaining portions of the rough blank which corresponds to a thin part of the golf club head, and triaxial weaving is performed on three of the fiber bundles to obtain another one of the remaining portions of the rough blank which corresponds to a thick part of the golf club head, so that the rough blank having an uneven thickness is obtained after continuous weaving of the fiber bundles; and wherein, in the forming step, energy is applied to the mold to melt the fibers of the at least one of the fiber bundles which are thermoplastic fibers, while the fibers of the remaining ones of the fiber bundles which are inorganic fibers or metal fibers are not melted, and the mold is pressurized to shape the rough blank, the golf club head being obtained after the fiber bundles are solidified.

2. The method as claimed in claim 1, wherein, in the weaving step, yet another one of the remaining portions of the rough blank are formed by weaving uniaxially single fiber bundles.

3. The method as claimed in claim 1, wherein, in the forming step, the energy applied to the mold is selected from a group consisting of chemical energy, light energy and radiation energy.

* * * * *